Patented Oct. 8, 1946

2,408,931

UNITED STATES PATENT OFFICE 2,408,931

PROCESS FOR STRIPPING LEAD FROM BEARINGS

Robert L. Heath, George A. Fisher, Jr., and Thomas R. Holbrook, Indianapolis, Ind., assignors to General Motors Corporation, Detroit, Mich., a corporation of Delaware No Drawing. Application March 8, 1943, Serial No. 478,420

3 Claims. (Cl. 75—97)

This invention has to do generally with a chemical process of stripping lead or lead alloys from metal surfaces and more particularly to the removal of a lead plating, a lead-tin alloy coating, or a lead-indium alloy coating from a steel-backed silver bearing.

Bearings comprising a facing of silver bonded to a steel backing member and having an electrodeposited coating or plating of lead on the silver followed by an electrodeposited coating or plating of either tin, or indium, and usually followed by a diffusion heat treatment to diffuse the tin or indium onto the lead, have been employed for aircraft engines. In the production of such bearings, it sometimes happens that "pin holes" are formed in the lead plating, blisters occur during fusion of the lead and tin, or the lead and indium, or the plating may be otherwise irregular and defective. It may also happen that foreign matter may collect in the lead alloy coating during "green" engine run. When these conditions occur, it is common practice to remove the lead or lead alloy coating by a boring operation and thereafter replate lead onto the silver facing and subsequently either tin or indium onto the lead. The boring operation is tedious, costly and could damage the silver layer unless performed carefully. The primary object of the present invention is to provide a chemical method of stripping lead, lead-tin, or lead-indium coatings from the surface of the bearings which will eliminate the present boring operation with the resultant disadvantages thereof. Other objects and advantages of the invention will become more apparent from the detailed description which follows.

Broadly the invention comprises the removal of lead or lead alloy coatings from metallic articles by subjecting the coated articles (as by immersion) to the action of a solution of glacial acetic acid and hydrogen peroxide.

In accordance with a specific embodiment of the invention a lead, lead-tin, or lead-indium coating may be satisfactorily removed from a steel-backed silver bearing by immersing the coated bearing in a solution of glacial acetic acid and hydrogen peroxide without etching the steel back or the silver layer when the procedure is closely controlled.

A solution found suitable in practice is one consisting of 95%, by volume, glacial acetic acid (99.5+% acetic acid) and 5%, by volume, hydrogen peroxide (30% or 100 volume $H_2O_2$). The temperature of the solution may vary considerably. In commercial practice room temperatures are preferred for practical reasons.

Before immersing in the solution of acetic acid and hydrogen peroxide, the bearings to be processed are wiped to remove excess oil and any rust spots are removed by buffing or polishing. Thereupon the bearings are suspended in the solution, care being taken that the bearings do not contact the sides or bottom of the tank containing the solution. A bearing as thus immersed in the solution is left in the tank until the lead or lead alloy coating is removed. The time will vary with the amount of lead to be removed, the temperature of the solution, whether the solution is agitated or not, the condition of the solution as regards the relative proportions of acetic acid and hydrogen peroxide, and the extent of use of the solution.

Increasing temperature results in decreasing the length of time a solution may be used effectively, and from a practical application the increased stripping rate obtained by heating the solution does not balance the decrease in length of service of the solution. The rate of stripping when solution is new and unagitated is approximately .001 inch lead, lead-tin, or lead-indium in 15–20 minutes. Stripping time may be decreased by agitating the solution. Rate of stripping decreases with use and is dependent upon the amount of lead or lead alloy being stripped. Production application of the solution is such that a new solution is used when stripping time exceeds production time. After the lead, or lead-alloy coating is stripped, the bearing is removed, rinsed thoroughly in water, then in an alkaline solution such as 5% ammonium hydroxide and finally in running water. Thereafter the bearing is wiped until dry and covered with oil.

Where wire racks are used it is important that the steel backs of the bearings be kept out of contact therewith. Etching will result where contact is made. Etching will also occur if the bearing touches the sides or bottom of the tank. A chemical degreasing treatment should not be employed since it leaves spots which are activated and which will etch when placed in the stripping solution. Water should not be added to the tank at any time as the dilution increases the ionization and activity of the solution to the extent that etching of the steel will result. Under no circumstances should moisture or water be present on the steel surface of the bearing. If water is present, a film of highly ionized and active solution will be formed upon the steel surface and etching will result. The bearings must be rust-free since if spots of rust are present, the spots will be very active if placed in the solution. A partially stripped bearing should not be exposed to the air for longer than five seconds.

Although the invention is particularly applicable to the stripping of lead or lead alloy coatings from a steel-backed silver bearing, it has application to the stripping of lead or lead alloy coatings from other bearings and other metal surfaces.

We claim:

1. The process of stripping a metallic coating of the class consisting of lead, lead-indium, and lead-tin from the silver facing of a steel-backed silver bearing which includes immersing said bearing in a solution consisting of glacial acetic acid, hydrogen peroxide and water until said coating is stripped from the silver facing of the bearing, thereafter washing the bearing and finally drying the same.

2. A process of stripping from a steel-backed silver bearing a metallic coating of the class consisting of lead, lead-tin and lead-indium which includes immersing said coated-bearing in a solution consisting of 95%, by volume, of glacial acetic acid and 5%, by volume, of an aqueous solution containing 30% hydrogen peroxide.

3. A process of stripping a metallic coating from a steel-backed silver bearing, said coating consisting of a metallic material of the class consisting of lead, lead-tin and lead-indium, which consists in wiping oil from the bearing, removing any rust spots which may be present by buffing, removing any moisture from the bearing, immersing the thus treated bearing in a solution consisting of 95%, by volume, of glacial acetic acid, and 5%, by volume, of an aqueous solution containing 30% hydrogen peroxide until the coating is stripped, thereafter thoroughly rinsing the bearing in water, then in an alkaline solution, then in water and thereafter drying the bearing.

ROBERT L. HEATH.
GEORGE A. FISHER, Jr.
THOMAS R. HOLBROOK.